United States Patent
Chhaya et al.

(10) Patent No.: US 10,163,116 B2
(45) Date of Patent: Dec. 25, 2018

(54) DETERMINING BRAND EXCLUSIVENESS OF USERS

(71) Applicant: Adobe Systems Incorporated, San Jose, CA (US)

(72) Inventors: Niyati Chhaya, Shivaji Nagar (IN); Kokil Jaidka, Chandigarh U.T. (IN)

(73) Assignee: Adobe Systems Incorporated, San Jose, CA (US)

( * ) Notice: Subject to any disclaimer, the term of this patent is extended or adjusted under 35 U.S.C. 154(b) by 576 days.

(21) Appl. No.: 14/450,065

(22) Filed: Aug. 1, 2014

(65) Prior Publication Data

US 2016/0034922 A1  Feb. 4, 2016

(51) Int. Cl.
*G06Q 30/02* (2012.01)
*G06Q 50/00* (2012.01)

(52) U.S. Cl.
CPC ......... *G06Q 30/0201* (2013.01); *G06Q 50/01* (2013.01)

(58) Field of Classification Search
CPC ......... G06Q 10/00; G06Q 40/00; G06F 17/00
USPC ............................................... 705/7.11–7.29
See application file for complete search history.

(56) References Cited

U.S. PATENT DOCUMENTS

| | | | | |
|---|---|---|---|---|
| 8,894,357 B2* | 11/2014 | Liu | ...................... | F04D 25/166 415/126 |
| 9,165,060 B2* | 10/2015 | Dies | .................. | G06F 17/30707 |
| 9,286,569 B2* | 3/2016 | Koran | .................... | G06Q 30/02 |
| 9,338,603 B2* | 5/2016 | Chao | ...................... | G06Q 30/00 |
| 2009/0132345 A1* | 5/2009 | Meyssami | .............. | G06Q 10/10 705/7.33 |
| 2011/0231244 A1* | 9/2011 | Bhatia | .................... | G06Q 30/02 705/14.43 |
| 2013/0073473 A1* | 3/2013 | Heath | ..................... | G06Q 30/02 705/319 |
| 2014/0164097 A1* | 6/2014 | Stoikovitch | ........ | G06Q 30/0243 705/14.42 |

OTHER PUBLICATIONS

Phan et al "Social Media and Luxury Brand Management: The Case of Burberry", Oct. 2011, Journal of Global Fashion Marketing, vol. 2, pp. 1-9 (Year: 2011).*

* cited by examiner

Primary Examiner — Romain Jeanty
(74) Attorney, Agent, or Firm — Shook, Hardy & Bacon L.L.P.

(57) ABSTRACT

Embodiments of the present invention relate to a determination of a user's exclusiveness toward a particular brand. User-specific entities are extracted from social media content associated with a user. At least a portion of the user-specific entities are brand-related entities that are specifically relevant to a particular brand. These brand-related entities are analyzed with respect to the user-specific entities extracted from the social media content to determine a level of exclusivity of the user to the brand.

18 Claims, 11 Drawing Sheets

DETERMINING BRAND EXCLUSIVENESS OF USERS

BACKGROUND

Social networking has become an increasingly popular presence on the Internet. Social network services allow users to easily connect with friends, family members, and other users in order to share, among other things, comments regarding activities, interests, and other thoughts. Social media websites may act as platforms for users to inadvertently publicize or criticize a brand by expressing their opinions about the brand. Customers of a brand often turn to the online social media space to express their appreciation or criticism for a product or compare its performance and features with its rivals. In addition to these activities, customers also express their interests in other topics and spheres, which can be used as an important insight into the typical interests of the brand's user base.

As social networking has continued to grow, organizations have recognized value in the technology. For instance, organizations have found that social networking provides a great tool for managing their brand by monitoring user comments that mention the brand, whether the comments are positive or negative. In contemporary approaches, marketers identify important users by filtering users based on an exact subset of words, which are deemed relevant to the brand. However, even after applying this filter, the amount of data to sift through is large to identify important influencers and brand users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems and methods for determining a user's exclusiveness with respect to a particular brand. Some users of social media may be exclusive to a particular brand, meaning that when the user expresses his or her opinion, it is exclusively or almost exclusively about that brand. Other users, however, comment about many brands, and thus may not be exclusive to a particular brand. For brand owners, such as a company associated with a brand, identifying users who are exclusive to their brand can be helpful in understanding how the company's particular products and/or services are being perceived by customers and potential customers. Also of interest to a company associated with a brand is a user's loyalty toward that particular brand. A user who is posting negative comments about a product/service/brand could be incentivized by the company to post less negative comments about the brand. The company could also use this knowledge to respond to the user's online activity.

BRIEF DESCRIPTION OF THE DRAWINGS

The present invention is described in detail below with reference to the attached drawing figures, wherein.

DETAILED DESCRIPTION

Figure 1:
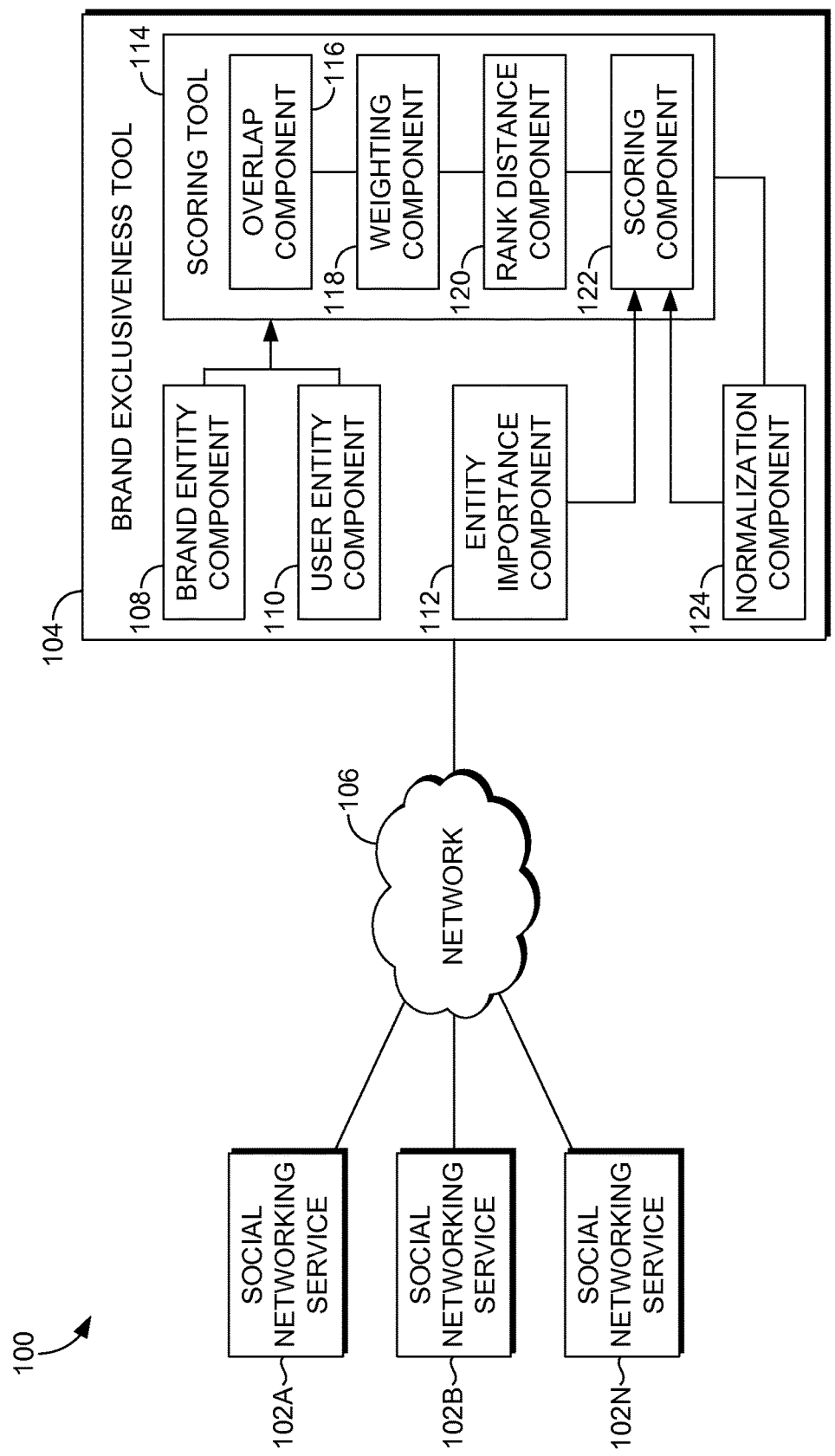
FIG. 1 is a block diagram showing a system for determining an exclusiveness of a user with respect to a particular brand, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to systems and methods for calculating a user's exclusiveness in relation to a particular brand. Exclusiveness, as used herein, refers to the proportion that a particular user talks (e.g., mention, comment, or post on social networking sites) about a particular brand taking into account everything the user is talking about. For instance, a user may participate in one or more social networking services, including the TWITTER, FACEBOOK, LINKEDIN, TUMBLR, and YOUTUBE services, to name a few. Online blogs and other forums on which users can express their opinions are also considered social networking services, as used herein. Using these social networking services as a platform, that user may express his or her opinions regarding certain products and services that are associated with various brands.

A user who is exclusive to a particular brand may not make many mentions about other brands. It should be mentioned that a user who is exclusive to a particular brand may not necessarily be loyal to that brand. For instance, a user may only talk about one brand but may express his or her negative opinions (e.g., posting negative content) about that brand, which could be undesirable or even damaging to the company and/or brand. In this case, the company or marketer associated with that brand may want to identify users who have expressed negative opinions about the brand so that these users can be incentivized to disengage from posting negative content. For example, the company or marketer associated with the brand could pay the user or respond to the user's online activity. Additionally, embodiments provided herein allow the company associated with the brand to target certain individuals for advertising or the like. Even further, embodiments allow companies and marketers to identify what customers and potential customers are saying about competitors. The users described in embodiments herein may be the target audience of a particular brand or may be any other person who participates in social media, such as posting content on social networking platforms.

To assist companies in their social networking efforts, some social analysis tools, such as the ADOBE SOCIAL tool, have been developed to provide mechanisms for determining a user's exclusiveness toward a particular brand. To make this determination, entities associated with a user (e.g., phrase extracted from social media content with which a user has interacted), hereinafter referred to as user-specific entities, and entities associated with a brand (e.g., specified by a company/marketer of the brand or extracted from company data), hereinafter referred to as brand-specified entities, are identified. The term entity, as used herein, includes hashtags, keywords, named entities (persons, locations, organizations, products), etc. As will be described in further detail herein, distributions of the user-specific entities and of the brand-specified entities are computed, hereinafter referred to as a user distribution and a brand distribution, respectively. The entities may be weighted and ranked so that an overall score can be computed. The overall score represents the user's exclusiveness toward a specific brand. The above-described process of determining a user's exclusiveness in relation to a particular brand allows for user content (e.g., social media content) to be analyzed in comparison to the interests of a company associated with a brand.

Additionally, the algorithms described herein may be used to determine a user's loyalty toward a particular brand. For instance, the user distribution described further herein may be used to target users who are loyal to a brand but not necessarily dedicated. In one aspect, this may be accomplished by the use of a learning algorithm based on a user's past brand behavior. The algorithm may further indicate a good prospect for brand loyalty as opposed to a user who is more of a wanderer (e.g., not loyal to a particular brand).

Accordingly, in one aspect, an embodiment of the present invention is directed to one or more computer storage media storing computer-useable instructions that, when used by one or more computing devices, cause the one or more computing devices to perform operations. These operations include extracting a plurality of entities from social media content that is associated with a user, where the plurality of entities comprise a set of brand-related entities that is relevant to a particular brand. The operations further include analyzing the set of brand-related entities with respect to the plurality of entities extracted from the social media content, and based, at least, on the analyzing, determining a level of exclusivity of the user to the brand.

In another embodiment of the invention, a computer-implemented method is provided. The method includes calculating, via a computing device, a distribution of a first set of entities extracted from one or more social networking services with which the user has participated. The method further includes weighting each entity in the first set of entities based on a total number of entities mentioned by the user. Further, based on the weighting, the method further includes ranking each entity in the first set of entities, and determining a difference between the rankings of entities that are in the first set of entities and entities in a second set of entities, wherein the entities in the second set are those in which the brand is interested. Additionally, the method includes, based, at least, on the difference between the rankings, calculating a score that represents the user's exclusiveness to the brand.

A further embodiment is directed to a computerized system comprising one or more processors and one or more computer storage media storing computer-useable instructions that, when used by the one or more processors, cause the one or more processors to perform various steps. These steps include identifying a plurality of user-specific entities within social media content that is associated with a user, comparing the plurality of user-specific entities with brand-specified entities that are of interest to a company associated with a brand, computing rankings for the plurality of user-specific entities and the brand-specified entities, and comparing the rankings of the plurality of user-specific entities to the brand-specified entities to determine the user's exclusiveness to the brand.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a number of social networking services 102A, 102B, 102N and a brand exclusiveness tool 104. It should be understood that the system 100 shown in FIG. 1 is an example of one suitable computing system architecture. Each of the components shown in FIG. 1 may be implemented via any type of computing device, such as computing device 1400 described with reference to FIG. 14, for example. The components may communicate with each other via a network 106, which may include, without limitation, one or more local area networks (LANs) and/or wide area networks (WANs). Such networking environments are commonplace in offices, enterprise-wide computer networks, intranets, and the Internet. It should be understood that any number of social networking services (as indicated by 102N) and brand exclusiveness tools may be employed within the system 100 within the scope of the present invention. Each may comprise a single device or multiple devices cooperating in a distributed environment. For instance, the brand exclusiveness tool 104 may be provided via multiple devices arranged in a distributed environment that collectively provide the functionality described herein. Additionally, other components not shown may also be included within the network environment.

The brand exclusiveness tool 104 may be employed by a company to assist in managing the company's brand. As used herein, brand refers to a name, term, design, symbol, or any other feature that identifies one product from other products. Among other things, the brand exclusiveness tool 104 operates to collect social media content from social networking services 102A, 102B, 102N. As represented in FIG. 1, social data may be collected from any number of social networking services. These services generally include any online presence at which users may share messages with other users within a social network of users. In some instances, the brand exclusiveness tool 104 may access social media content directly from a social networking service, or an entity providing the data to the brand exclusiveness tool 104 may access the data from a social networking service and provide the data to the brand exclusiveness tool 104. For instance, a social networking service may provide APIs that expose the data. In other instances, the brand exclusiveness tool 104 may access social data from a third-party social data aggregator, which may operate to access data from one or more social networking services, standardize the data, and provide the standardized data. Any and all such variations are contemplated to be within the scope of embodiments of the present invention.

Social networking services 102A, 102B, 102N may be services with which a particular user has had interactions. In some embodiments, a social networking service is a website or application dedicated to enabling users to communicate or interact with one another via posting comments, messages, images, or other social content. That is, a primary functionality is for a user to interact with other users of the social networking service using social content. In this regard, multiple users can not only read comments, but also contribute to the content (e.g., in the form of comments, reviews, posts/likes, etc.). Examples of social networking services may include, for instance, the TWITTER, FACEBOOK, LINKEDIN, TUMBLR, and YOUTUBE services, to name a few. Additionally, blogs or other online forums that allow users to post comments or other written information are also considered social networking services, as used herein. A user interaction with a social networking service may include a social mention, which may include any social networking message initiated by the user, and/or a message with which the user has interacted. For instance, a user tweet on the TWITTER, a posting on FACEBOOK, or even an article or comment posted by the user on a blog could be user interactions with a social networking service.

As shown in FIG. 1, the brand exclusiveness tool 104 includes, among other things not shown, a brand entity component 108, a user entity component 110, an entity importance component 112, a scoring tool 114, and a normalization component 124. Initially, the brand entity component 108 is generally responsible for obtaining data from a company associated with a particular brand, extracting entities from the data, and calculating a brand distribution of the entities. As used herein, a brand distribution is a weighted distribution of entities that are associated with a particular brand. The brand distribution indicates how important each entity is compared to the other entities. The calculation of the brand distribution will be described in more detail herein with respect to FIG. 2. The data may be received from the company in one or many possible ways. For instance, the company may provide a large amount of data that is then processed to identify the entities. Alternatively, the company data could be monitored by, for example, the brand entity component 108 or some other component, to identify entities. In yet another embodiment, a company may provide a list of entities, instead of data from which entities are extracted. The data, in one embodiment, is data from social networking services. Similar to how the user data, described below, is retrieved, the company data may also come from social networking services, but instead of being associated with a specific user, it is associated with the brand.

In embodiments, these entities extracted from the company data or provided by the company are termed brand-specified entities. As used herein, brand-specified entities reflect the interests of a brand, such as things that people are talking about with regard to the brand. Further, the term entities, as used herein, includes hashtags, keywords, named entities (persons, locations, organizations, products), etc. Generally, an entity can be any word, term, or phrase that can be related to a particular brand. While the brand-specified entities are described as being received from a company associated with a brand, it will be understood that these entities could come from one or more other sources, such as a marketing company responsible for marketing of a specific brand.

In addition to brand-specified entities extracted from company data or provided from the company or marketer associated with the brand, entities not explicitly found in the data or not explicitly identified by the company or marketer may be added to the set of brand-specified entities. These entities may be added based on a high co-occurrence and/or correlation to the brand-specified entities that were specified by the company or extracted from the company data. These entities may not have been explicitly specified by the company or found in the company data, but because the entities are highly correlated to the brand-specified entities, they may be added to the set of brand-specified entities. For instance, a company may be interested in the entity "tablet" for a particular brand, but because the entities "iPad," "Surface," and "Kindle" have a high co-occurrence to the entity "tablet," these entities may be included in the brand distribution. This process may also be explained as expanding the brand-entity space.

Figure 11:
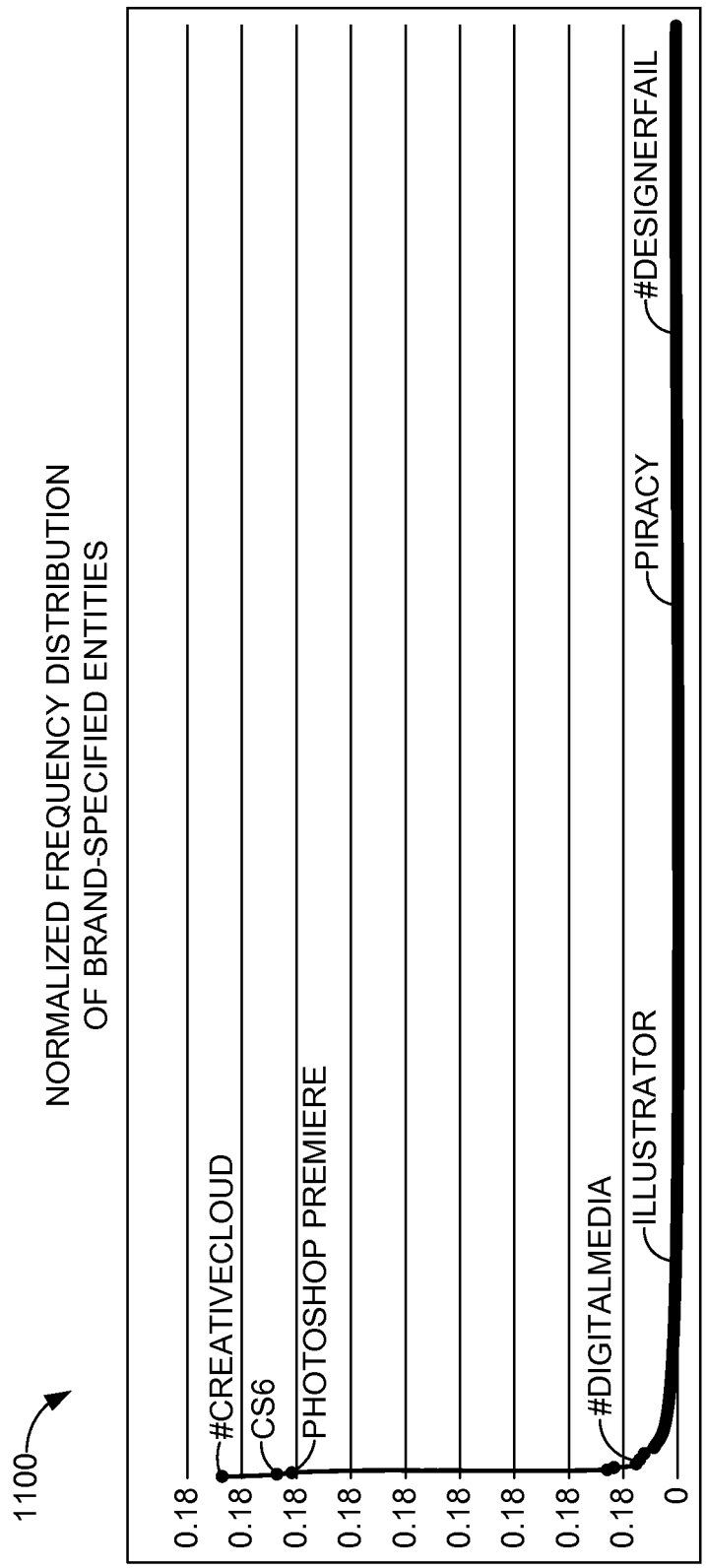
FIG. 11 is a frequency distribution graph of brand-specified entities, in accordance with an embodiment of the present invention.

An example of a brand distribution can be seen in FIG. 11. As illustrated, various entities, including hashtags and other words/terms, that are related to a particular brand are plotted in the normalized frequency distribution graph 1100 of FIG. 11. In this particular embodiment, ADOBE Creative Business is the brand, and the brand-specified entities include #creative cloud, CS6, Photoshop Premiere, #digitalmedia, Illustrator, piracy, and #designerfail. This graph 1100 indicates that #creativecloud most frequently appears in the data received from the company associated with the brand. An exemplary interpretation of this is that #creativecloud is more important of an entity to ADOBE than the other entities in the graph 1100. In embodiments, the data used for the graph of FIG. 11 can be normalized by dividing a quantity of occurrences for each entity by the total quantity of occurrences of all entities. Statistical normalization may be used, in addition to term frequency-inverse document frequency (TFIDF) and other methods not specifically mentioned herein.

In one embodiment, not all entities are retained in the set of brand-specified entities. As shown in FIG. 11, the entities "Illustrator," "piracy," and "#designerfail" may be considered to be insignificant in determining how exclusive a user is to a brand, as the quantity of occurrences of these entities is near zero. As such, these entities, in one embodiment, are discarded from the brand-specified entities that are further processed to determine a user's exclusiveness to a brand.

The user entity component 110 is generally responsible for analyzing social media content associated with a particular user, identifying entities in this content, and calculating a user distribution. The functions of the user entity component 110 are similar to those described above with respect to the brand entity component 108, except that here, the data is social media content associated with a user. More specifically, this content may be received from one or more social networking services, such as services 102A, 102B, 102N of FIG. 1. The user distribution is a weighted distribution of the entities extracted from the social media content. These extracted entities, referred to herein as user-specific entities, indicate topics of interest to a user, or topics that the user is or has discussed in a social media context.

The entity importance component 112 is generally responsible for determining a proportion for each user-specific entity with respect to all entities extracted from the social media content associated with the user. This provides an indication as to how important each term is to the user. In one embodiment, a weight is calculated for each entity based on, for example, a frequency of occurrences of that entity with respect to all entities mentioned by the user.

The scoring tool 114 comprises, among other components not shown, an overlap component 116, a weighting component 118, a rank distance component 120, and a scoring component 122. Each of these components within the scoring tool 114 assists in the calculation of the final score, which indicates how exclusive a particular user is to a particular brand, with the brand-specified entities and the user-specific entities being the input. The detailed calculations for each step will be provided below in relation to FIG. 2.

The overlap component 116 determines an overlap between the user space and the brand space. Stated in a different way, the overlap component 116 determines a proportion of user-specific terms that are also brand-specified terms, and a proportion of brand-specified terms that are also user-specific terms. The weighting component 118 calculates a weight for each user-specific entity and for each brand-specified entity. The weight of each entity represents the entity's importance. In one embodiment, the weight is calculated by analyzing the quantity of instances a particular entity appears in social media content associated with the user compared to all occurrences of all entities. As such, for a user-specific entity, the weight may be calculated by dividing the quantity of instances that the particular user-specific entity appears in the social media content by a total quantity of times all user-specific entities appear in the social media content. Similarly, for a brand-specified entity, the weight may be calculated by dividing the quantity of instances that the particular brand-specified entity appears in the company data by a total quantity of times all brand-specified entities appear in the company data.

The rank distance component 120 initially determines a ranking for each of the brand-specified entities and the user-specific entities and, using the rankings, calculates the differences between the rankings for each entity. A rank distance is calculated, which will be described in more detail with respect to FIG. 2. As will also be discussed in more detail herein, the distance calculated by the rank distance component 120 may be a Euclidian distance, which is the distance between pairs of points in Euclidean spaces. The scoring component 122 takes the previously calculated information, including the overlap of the brand-specified entities, the user-specific entities, and the rank distance, and determines an overall score. This overall score represents how close and exclusive the user is to the topic or, stated another way, the exclusiveness of the user to the brand. In one instance, if ranks for user-specific entities are generally significantly lower than rankings for brand-specified entities for a particular brand, the overall score is likely to be low, indicating that there is not much overlap between the user-specific entities and the brand-specified entities for the particular brand.

The normalization component 124 is utilized when an approximation of the algorithm is needed. For instance, when the amount of social media content associated with the user does not meet a predetermined threshold, the normalization component 124 may be utilized to compute a normalized rank based on partial scoring, as a full set of social media content may not have been available for the other components of the scoring tool 114 to compute a rank distance and an overall score, as described above.

Figure 2:
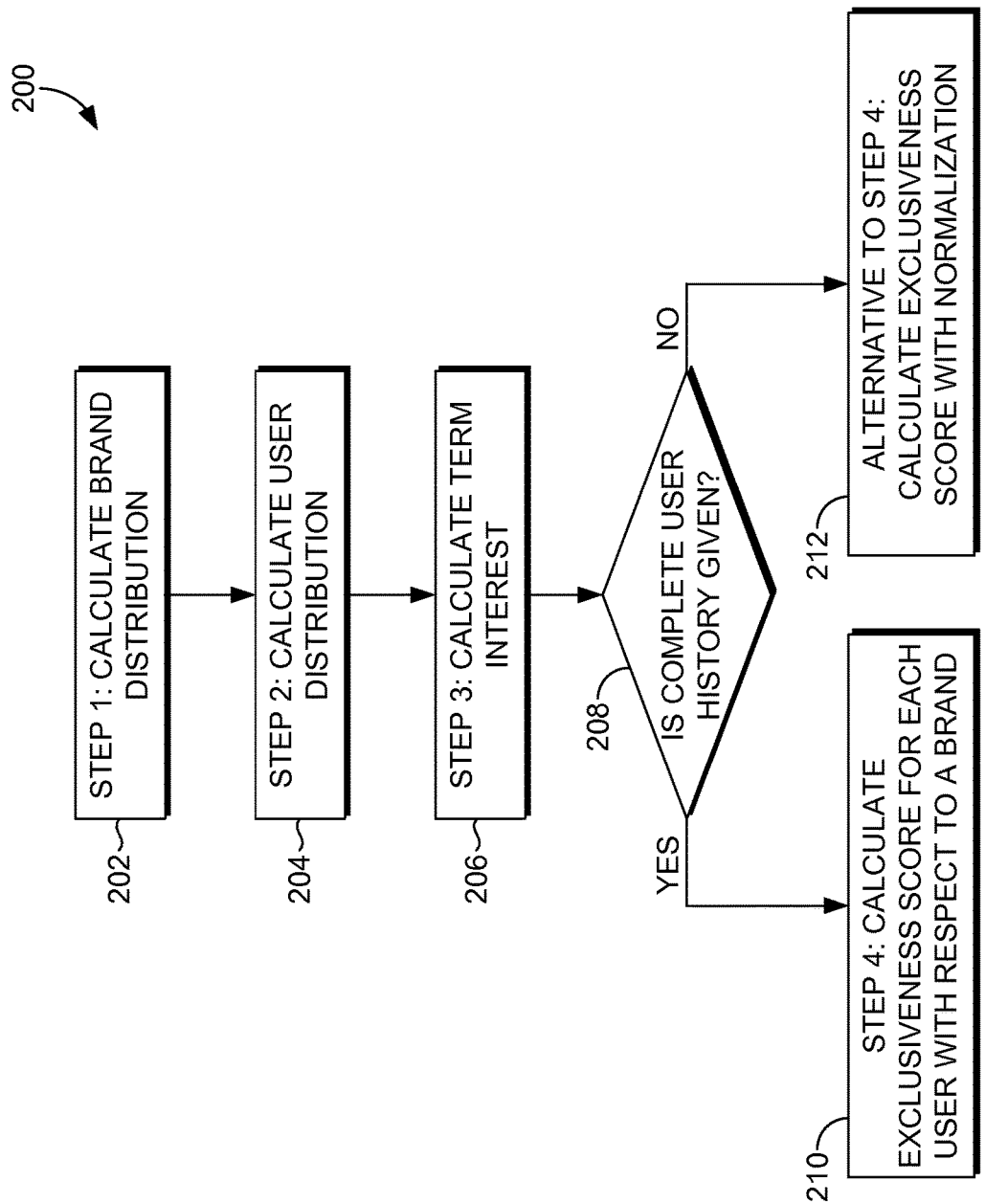
FIG. 2 is a flow diagram showing a method of steps for determining an exclusivity of a user with respect to a particular brand, in accordance with an embodiment of the present invention.

With reference now to FIG. 2, a flow diagram is provided that illustrates an overall method 200 for determining an exclusiveness of a particular user to a particular brand based on social media content associated with the user, in accordance with an embodiment of the present invention. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a social analysis tool, such as the ADOBE SOCIAL tool.

Figure 3:
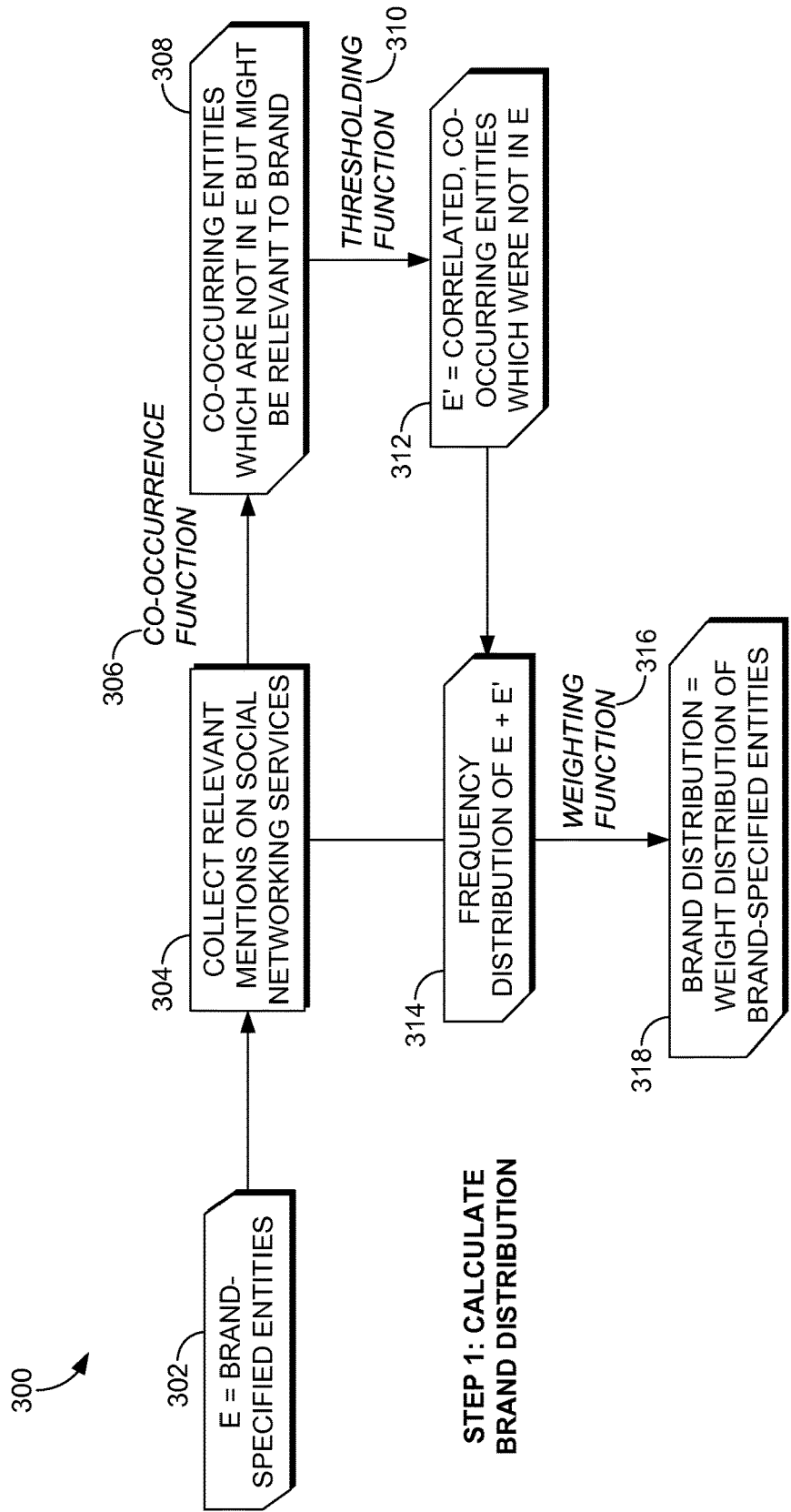
FIG. 3 is a flow diagram showing a method for calculating a brand distribution, in accordance with an embodiment of the present invention.
Figure 12:
FIG. 12 is a visual representation of user distribution, in accordance with an embodiment of the present invention.
Figure 13:
FIG. 13 is a visual representation of brand distribution, in accordance with an embodiment of the present invention.

While the steps of the method 200 of FIG. 2 have been described at a high level with regard to the components of FIG. 1, the following will provide a more in-depth explanation of each step, including the equations used. Initially at block 202, the first step is to calculate the brand distribution, which may be performed by, for example, the brand entity component 108 of FIG. 1. As previously described, the brand distribution is the weight distribution (e.g., based on frequency of entities) of the brand-specified entities. FIG. 3 will be referred to herein with respect to block 202, as FIG. 3 is a flowchart of the steps taken to calculate the brand distribution. As previously described, FIG. 11 illustrates a normalized frequency distribution graph 1100 of various brand-specified entities. FIG. 12 is provided as a visual representation of brand-specified entities. As shown, the smaller lettering visually represents a smaller frequency distribution (e.g., the entity occurs less frequently in the company data, and thus is of lesser interest to the company associated with the brand), while the larger lettering visually represents a higher frequency distribution (e.g., the entity occurs more frequently in the company data, and thus is of more interest to the company associated with the brand).

The brand distribution specifies the space against which the users are scored. Initially, the search entities (E) are identified, followed by the identification of the presence of each $e_i \in E$ in the historic data collected during monitoring this search space. This is further shown by blocks 302 and 304 of FIG. 3, where brand-specified entities are defined, and relevant mentions, which include the brand-specified entities, are collected or extracted from the social networking services. The search space referred to herein is the company data from which the brand-specified entities are extracted. Based on this presence calculation, a frequency distribution N of the terms $e_i$ is built. As mentioned, a frequency distribution, such as that shown in the graph 1100 of FIG. 11, may be used to weight terms in this search space.

A set of words E1 that were not explicitly found in the company data or not explicitly provided by the company are identified where the co-occurrence or correlation ρ of the terms $e_j^1 \in E^1$ with E is high. This identification may be termed a co-occurrence function, labeled as item 306 of FIG. 3. Block 308 of FIG. 3 indicates that co-occurring entities which are not in E but that might be relevant to the brand are identified.

A threshold λ is defined such that every co-occurrence value ρ>λ is classified as 'high.' A thresholding function is shown as item 310 in FIG. 3, and is applied to the newly-identified entities. The thresholding function 310, in one embodiment, discards the entities whose frequency distribution is below a predetermined threshold, meaning that these entities were not frequently occurring in the company data. The entities that are discovered through this co-occurrence process are then added to the search space E with frequencies $N^1$ calculated. E' is defined, at block 312 of FIG. 3, as correlated, co-occurring entities that were not included in E. As such, the brand-specified entities can be shown as $E_{new} = E + E^1$. A frequency distribution is calculated for this new set of brand-specified entities, shown at block 314 of FIG. 3. $E_{specific}$ buzz refers to the brand distribution, as previously defined herein as being the weighted-distribution of the search-space $E_{new}$, where the weights come from the calculated frequencies. The weighting function applied to the frequency distribution is represented by item 316, and block 318 represents the brand distribution. The brand distribution, or $E_{specific}$ buzz, may be mathematically represented as:

$$E_{specific} \text{Buzz} = \Sigma w_i * \mu_i * e_i$$

where, $\mu_i \in N_{new}$, $e_i \in N_{new}$, and $w_i$ signifies a discount factor to be attached to a certain term to give it lesser importance. The default value of $w_i$ is 1.

Figure 4:
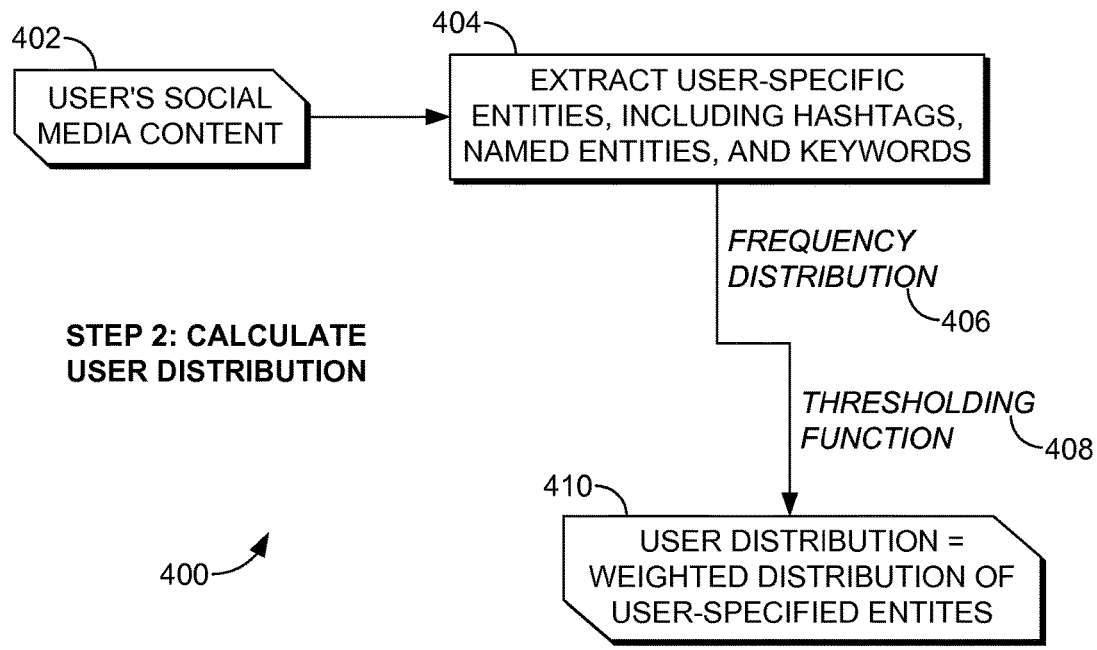
FIG. 4 is a flow diagram showing a method for calculating a user distribution, in accordance with an embodiment of the present invention.

Returning to FIG. 2, at block 204, the user distribution is calculated by, for example, the user entity component 110 of FIG. 1. FIG. 4 will be referred to herein with respect to block 204, as FIG. 4 illustrates a flow diagram of a method 400 for the calculation of the user distribution and, as such, will be referenced herein. A social network user is likely to have multiple interests. As mentioned, these interests can be extracted from his or her posted data from social media content, illustrated at blocks 402 and 404 of FIG. 4. The interest distribution of a user is defined based on the entities (e.g., keywords, named entities, phrases) in the social media content. This content is then weighted against the frequency distribution to define the user buzz, $u_i$buzz. The user buzz is the user distribution. Calculation of the $u_i$buzz includes (1) extracting entities, including top hashtags, named entities, and keywords from user's social media content, (2) building a frequency distribution of a the user data (frequency distribution function 406 of FIG. 4), (3) assigning weights to the extracted entities, and (4) thresholding the frequency histogram to define a buzz cut-off (thresholding function 408 of FIG. 4). The user distribution is represented by block 410 of FIG. 4.

Figure 5:
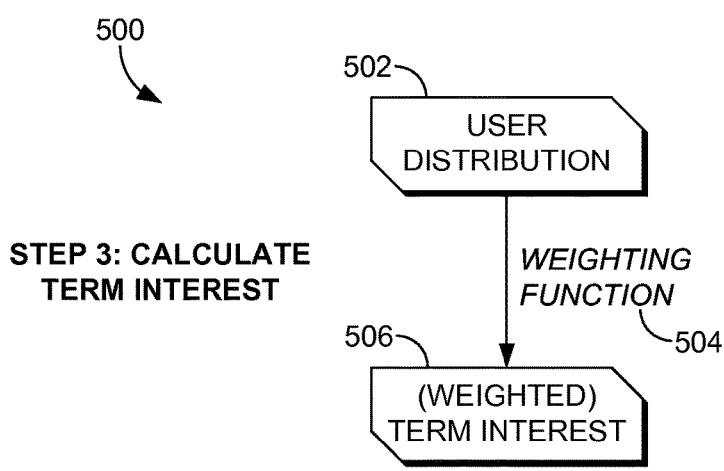
FIG. 5 is a flow diagram showing a method for calculating a term interest, in accordance with an embodiment of the present invention.

At block 206, term interest, also referred to herein as entity interest, is calculated by, for example, the entity importance component 112 of FIG. 1. FIG. 5 illustrates a flow diagram of a method 500 for the calculation of the term interest and, as such, will be referenced herein. Entity interest is the notion of exclusivity of the user-specified entities extracted from the social media content in relation to a particular brand. The user distribution described above is utilized, represented by block 502 of FIG. 5, so that each entity $e(u_i)$ can be assigned a weight based on the user's use of that entity (e.g., frequency of entity $\mu(e(u_i))$ with respect to the users global entity list $E(u_i)$). Term interest $t_e^{u_i}$ for term $e(u_i)$ is defined as $$t_e = \frac{1}{\text{count}(E(u))} * \frac{\mu(e)}{\Sigma u_i}$$

where, count(E(u)) signifies a total number of entities used by the user u, $\mu(e)$=frequency of entity e used by user, and $\Sigma(\mu_1)$=summation of all occurrences of all entities used by the user. This implementation assumes all entities have equal weights. When each term e has a weight $w_e$, this signifies the importance to be given to the term. The weighting function 504 of FIG. 5 is used to provide weights to the entities. In this situation, $t_e$ is given by $$t_e == \frac{w_e * \mu(e)}{\Sigma w_i * \mu(i)}$$

where the weighted term interest, $t_e$, is represented by block 506 of FIG. 5.

Figure 6:
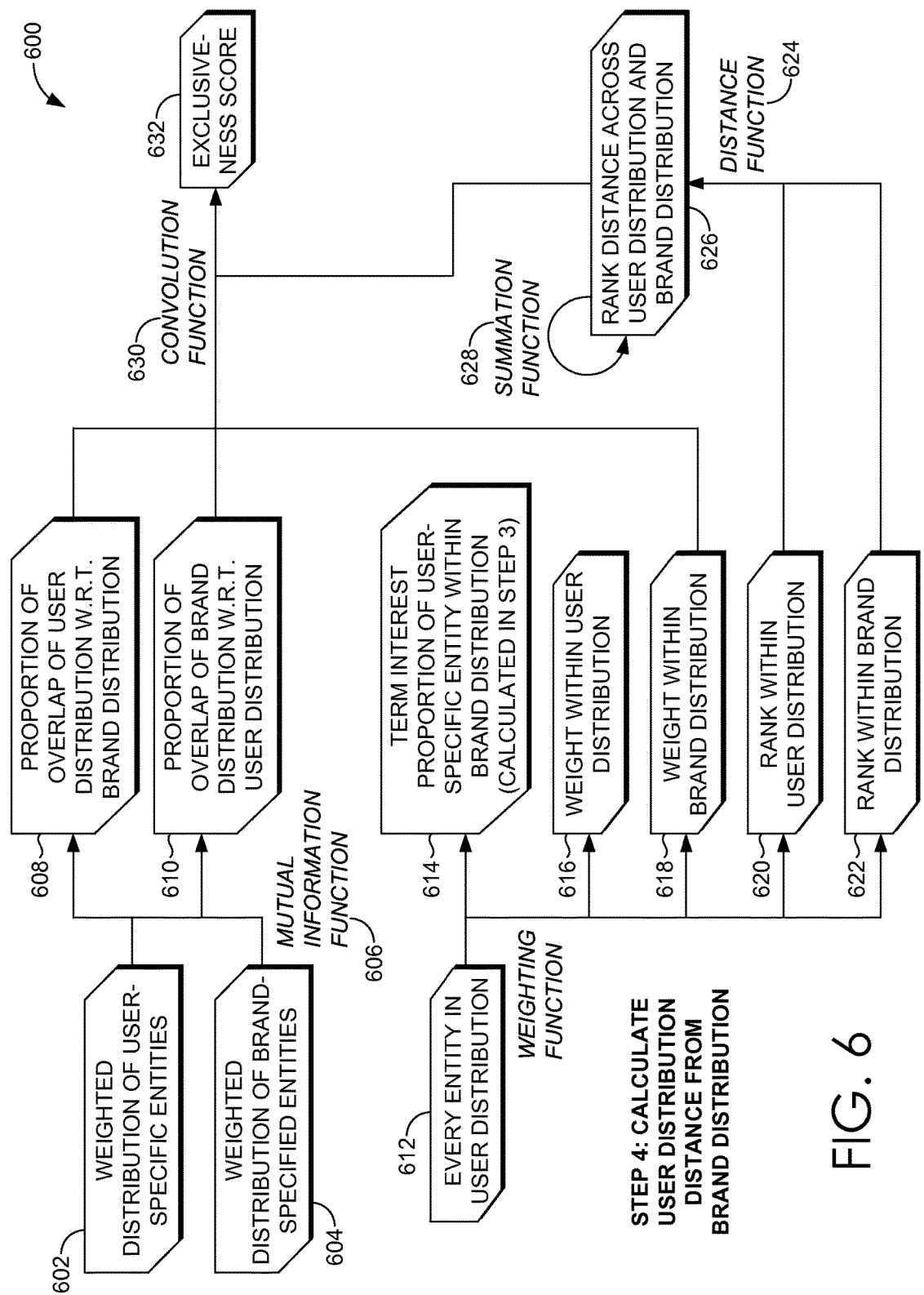
FIG. 6 is a flow diagram showing a method for calculating a distance of a user distribution from a brand distribution, in accordance with an embodiment of the present invention.

Returning again to FIG. 2, at block 208, it is determined whether the complete user history has been provided by the social media content associated with the user that has been analyzed. If the complete user history is available via the social media content, block 210 indicates that step 4 is performed, which is to calculate an exclusiveness score for each user with respect to a brand. The calculation of the overall score, or exclusiveness score, may require the performance of several steps, as explained below, which are also provided in the flowchart of FIG. 6. FIG. 6 illustrates a method 600 for the calculation of the distance between the user distribution and the brand distribution. User distribution (block 602) and brand distribution (block 604) are the initial inputs to the calculation of the exclusiveness score. The step-by-step method for calculating the exclusiveness score is provided below.

Initially, as shown by block 608 of FIG. 6, the amount of overlap of the user distribution with respect to the brand distribution is determined. At a high level, this captures how much of the brand is in the user's space. The overlap may also be described as a proportion of brand-specified entities in the user space, as shown by the equation below. This step represented by block 608 is a way of combining the notion of term interest, described above with respect to FIG. 5, and the user distribution, described above with respect to FIG. 4. It is also defined as contribution of the brand-specified entities in the user distribution. This overlap can be represented as:

$$N(u) = \frac{u \cap E}{u}$$

where, N∈[0,1], u=number of matching user-specific entities e(u) from the user distribution, $u_i$buzz, and where E=total search space specified by all entities found in the search space. For a company associated with a brand, the default value for the search space is the brand-relevant information.

Next, as shown at block 610 of FIG. 6, the overlap of the brand distribution with respect to the user distribution is determined. This term specifies the proportion of the $E_{specific}$ topics that are covered by the user. Mathematically, this overlap can be represented as:

$$N(e) = \frac{u \cap E}{E}$$

Block 612 of FIG. 6 indicates that every entity in the user distribution is utilized for the upcoming step of determining term interest proportion of the user-specific entities within the brand distribution, shown at block 614, which was previously calculated in step 3 (block 206 of FIG. 2).

At block 618 of FIG. 6, weights are calculated for each brand-specified entity in the $E_{specific}$Searchspace (brand space). At a high level, these weights indicate the importance of each brand-specified entity with respect to the company data that was analyzed (e.g., brand space or search space). Stated in another way, the weights calculated at block 618 are based on a proportion of a user's entity's contribution to the overall topic distribution of the brand, and as such, these weights are considered an indication of how interesting the brand (e.g., the company associated with the brand) finds this particular entity. In one embodiment, weights are provided only to the brand-specified entities that overlap with the user-specific entities. The equation shown below captures the number of times a user mentions an entity compared to all occurrences of all entities. Mathematically, the calculation of the weights can be represented as:

$$W(e)(E_{specific}) = \frac{count(e)}{E_{specific}}$$

where E=e(i)=All buzz words (entities) for the search-space (brand or $E_{specific}$).

Similarly, weights are calculated for each user-specific entity, shown at block 616 of FIG. 6. At a high level, this weight calculation captures the importance of user-specific entities for the user with respect to all entities mentioned/used by the user. In one embodiment, weights are provided only to the user-specific entities that overlap with the brand-specified entities. Mathematically, the weight calculation can be represented as follows:

$$W(e)_u = \frac{count(e(u))}{e(u_i)}$$

where $e(u_i)$=all terms used by the user.

Shown at blocks 620 and 622 of FIG. 6, rankings are provided for each of the user-specific entities and the brand-specified entities that overlap in the user space and the brand space (e.g., the user-specific entities that overlap with the brand-specified entities). Using these rankings, a rank distance is calculated, utilizing a distance function 624, represented by block 626 of FIG. 6. The rank distance calculation combines the empirical differences in the user and the $E_{specific}$ (brand) space with the relative position of the user interest and the $E_{specific}$ (brand) distribution. A naive implementation of this rank calculation is given by Euclidean distance between user-specific entity rankings and brand-specified entity rankings. The rankings are derived by ordering the user-specific and brand-specified entities, such as those that overlap, in a decreasing order, respectively. The rank distance measure, represented by item 624, can be specified as:

$$\text{Rank Distance} = d(p, q) = \sqrt{\begin{array}{l}(p_1 - q_1)^2 + (p_2 - q_2)^2 + \ldots + \\ (p_i - q_i)^2 + \ldots + (p_n - q_n)^2\end{array}}$$

where p=rank of entity e in $E_{specific}$-buzzwords (brand-specified entities), E=[1, e], and q=rank of entity (e) in user buzzwords (user-specific entities) U=(1, u). The summation function illustrated in the equation above is represented by item 628.

Once the rank distance is calculated, the overall score, or exclusiveness score can be calculated, represented by block 632 of FIG. 6. At a high level, this score represents how close and exclusive the user is to a particular brand. The score is mathematically represented by the following equation:

$$BuzzScore(u)E_{specific} = \frac{N_w(U) * N_w(E)}{RankDistance(u)^{topterms}}$$

where $N_w$=w(e). $N_w(U)$ represents how much the user is talking about the brand (e.g., how much the user has mentioned the brand), while $N_w(E)$ represents how exclusive the user is to the brand. The equation shown above provides a score for a user with respect to a rank of the entities.

Further, the BuzzScore($E_{specific}$) may also be represented as:

Distance(UserBuzz($E_{specific}$),$E_{specific}$Buzz)

where,

UserBuzz($E_{specific}$)=Σ($t_e$)

and where $t_e$=term interest for the term (e) with respect to the user (u) for the search space E. The equation above is a different way to represent a score, and instead of being computed with respect to the rank of the entities, it is computed with respect to the distance values calculated above. The functions above are represented by the convolution function 630.

Figure 7:
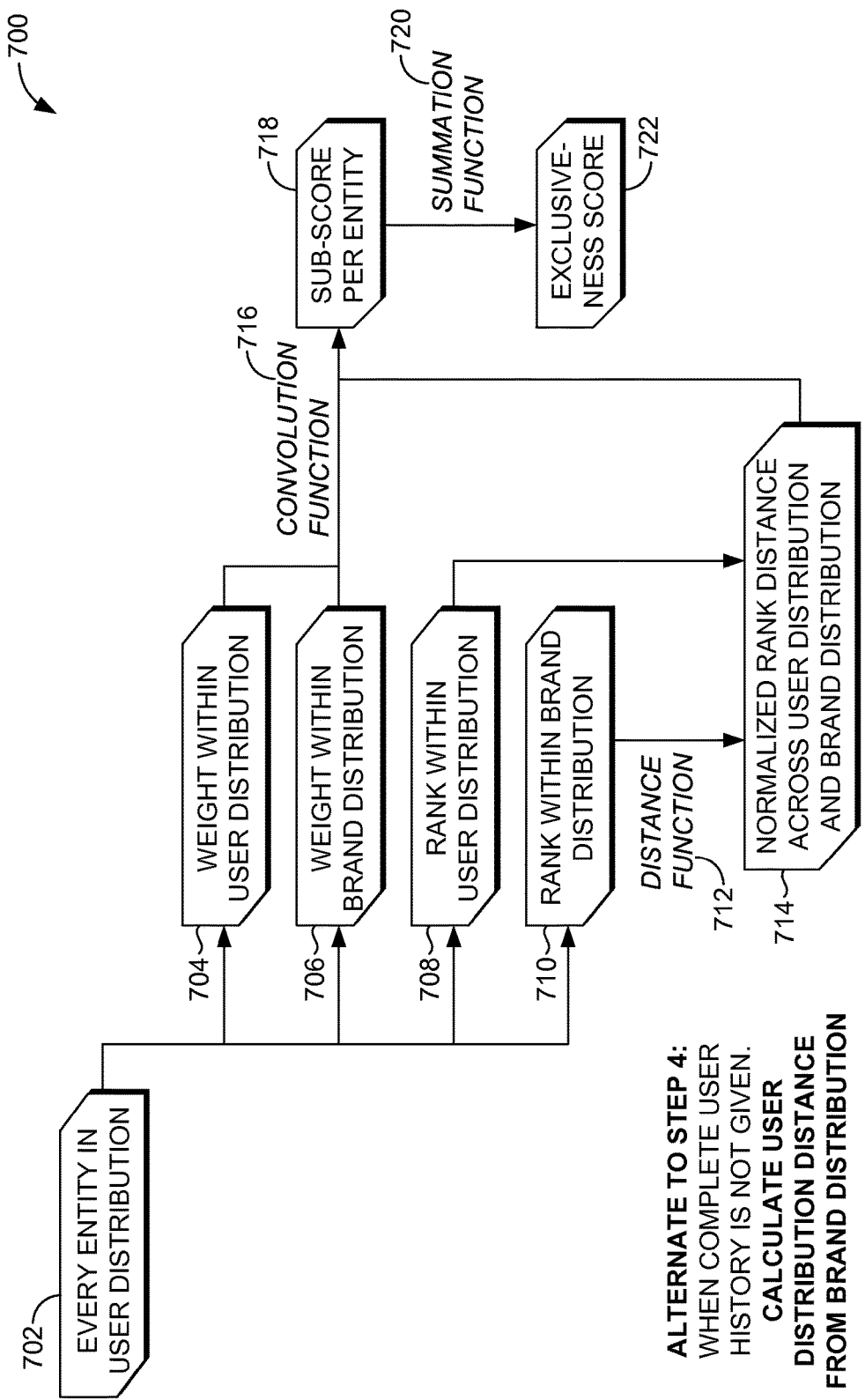
FIG. 7 is a flow diagram showing an alternative method for calculating a distance of a user distribution from a brand distribution, in accordance with an embodiment of the present invention.

Returning to FIG. 2, if the complete user history is not provided at block 208, an alternative to step 4 may be taken, which calculates the exclusiveness score with a normalization function, represented by block 212. FIG. 7 illustrates a flow diagram of a method 700 for the alternate calculation for overall score and rank distance when normalization is used, and as such will be referenced herein. As shown in FIG. 7, the user-specific entities in the user distribution are used (block 702) to calculate the weight of the user-specific entities within the user distribution (block 704), the weight of the user-specific entities within the brand distribution (block 706), the rankings of the user-specific entities within the user distribution (block 708), and the rankings of the brand-specified entities within the brand distribution (block 710). The calculation of these weights and rankings is similar to what was described above with respect to blocks 616, 618, 620, and 622 of FIG. 6, and thus will not be repeated here. The approach for scoring described above with respect to FIG. 6 assumes the availability of non- $E_{specific}$ data for the user. Non-$E_{specific}$ data refers to the data associated with the user (e.g., posted by the user) that is not relevant to the entity space. Stated differently, the complete user data stream may not be available. Typically in social media monitoring solutions, only $E_{specific}$ user stream is available to the customer.

To deal with this situation, the absolute scoring described above can be bypassed, and instead the following approach can be used to rank users on their exclusivity to a particular brand. The convolution function 716 and the summation function 720 of FIG. 7 are illustrated in the equations provided below.

$$\text{UserRank}(E) = \Sigma(\text{subscore}(\text{hashtags, organizations, products, locations}))$$

where, $$\text{subscore}(e) = \frac{\left(\frac{\mu(e_u)}{\Sigma(e_u)}\right) + \left(\frac{\mu(e)}{\Sigma(E_{specific})}\right) * 1000}{\text{mod}(\text{NormalizeRankDistance})}$$

and where, $$\text{NormalizeRankDistance} = \frac{\text{rank}(u)}{U} - \frac{\text{rank}(e)}{E}$$

where, $e = E_{specific}$ buzzword, E list of relevant $E_{specific}$ words (brand-specified entities) u=user-specific entity, U=list of all user-specific entities. The subscore(e) computation above is represented by block 718. This distance function is represented by item 712, and block 714 indicates that a normalized rank distance across the user distribution and the brand distribution is computed. In one embodiment, in addition to a normalized rank, an overall or exclusiveness score may also be computed, represented by block 722.

Figures 8, 9:
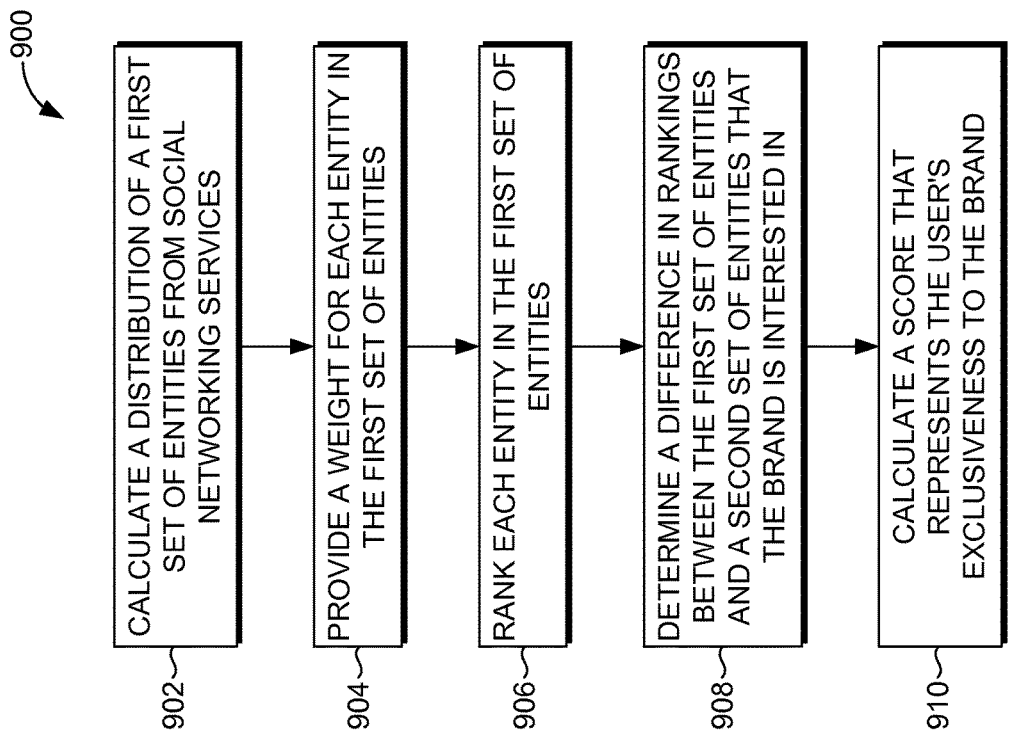
FIGS. 8-10 depict flow diagrams showing methods for determining a user exclusivity with respect to a brand, in accordance with embodiments of the present invention.

Turning now to FIG. 8, a flow diagram is provided of a method 800 for determining a user's exclusivity with respect to a particular brand, in accordance with an embodiment of the present invention. Initially, at block 802, a plurality of entities, also referred to herein as user-specific entities, are extracted from social media content associated with a user. The social media content may come from one or more social networking services with which the user has participated, such as the TWITTER, FACEBOOK, LINKEDIN, TUMBLR, and YOUTUBE services, to name a few. The plurality of entities, in one embodiment, comprises a set of brand-related entities, where these entities are specific to a particular brand. As such, at least portion of the plurality of entities extracted from the social media content may not be relevant to the particular brand, but instead may be relevant to one or more other brands. In one embodiment, in addition to the brand-related entities that are related to a particular user, brand-specified entities are identified, which are entities of interest to a company associated with the brand. In one instance, these entities are found in data associated with the brand, which, for example, may come from social networking services.

At block 804, the brand-related entities are analyzed with respect to the plurality of entities extracted from the social media content. The analyzing step above may comprise calculating a distribution, such as a frequency distribution, of the entities in the set of brand-specified entities, described in detail with respect to FIG. 3, in addition to a distribution of the entities in the plurality of entities from the social media content associated with the user, described in detail with respect to FIG. 4. An exemplary frequency distribution of brand-specified entities is illustrated in FIG. 11. Additionally, in embodiments, once a distribution is calculated, a threshold may be applied so that only entities having a distribution above the threshold are kept and, the others are discarded and not further analyzed. As is shown in FIG. 3 and further described herein, entities that have a high co-occurrence or correlation with entities specified by a brand may be included in the set of brand-specified entities, even though the entities with the high co-occurrence or correlation may not be explicitly found in the company data.

Additionally, the analyzing of block 804 may further include determining a weight for each entity in the brand-related entities (associated with the user) and each entity in the brand-specified entities (associated with the brand). As described above in more detail with respect to blocks 616 and 618 of FIG. 6, the weights are used to determine rankings of the entities, which are used to calculate the overall or exclusiveness score. As such, the analyzing may also include using the determined weights to provide a ranking for at least a portion of the entities in the set of brand-related entities, and similarly, using the weights to provide a ranking for at least a portion of the entities in the set of brand-specified entities. A rank distance measurement may then be computed based on a difference between the rankings for corresponding entities in the set of brand-related entities and the set of brand-specified entities.

At block 806, a level of exclusivity of the user in relation to the brand is determined. The determination of the level of exclusivity may be made by determining an overlap of brand-related entities and brand-specified entities, which may include calculating a proportion of the plurality of entities in the social media content that are in the set of brand-specified entities, and similarly calculating a proportion of the entities in the set of brand-specified entities that are also in the plurality of entities in the social media content. From these calculations, including the rankings of the entities, a score is computed that represents the user's exclusiveness to the brand.

In one embodiment, in addition to the brand-related entities that are related to a particular user, brand-specified entities are identified, which are entities of interest to a company associated with the brand. In one instance, these entities are found in data associated with the brand, which, for example, may come from social networking services.

Referring now to FIG. 9, a flow diagram is provided of a method 900 for determining a user's exclusivity with respect to a particular brand, in accordance with an embodiment of the present invention. Initially at block 902, a distribution of a first set of entities, also referred to herein as user-specific entities, from social networking services with which the user has participated is calculated. This step may be performed, for example, by a computing device. In addition to the first set of entities, a distribution may also be calculated for a second set of entities in which the brand is interested, also referred to herein as brand-specified entities. As mentioned, the second set of entities may be extracted from company data that is associated with the brand. In embodiments, included in the second set of entities are not only the entities specified by the brand or explicitly found in the company data, but also entities that have a high co-occurrence or correlation with the entities found explicitly in the company data.

At block 904, a weight for each entity in the first set of entities is provided. Based, at least partially, on the weights, each entity in the first set of entities is ranked, shown at step 906. In addition to a weight, an overlap between the first and second sets of entities may also be determined.

At block 908, a difference between rankings of entities in the first set of entities and the second set of entities is determined. In embodiments, the second set of entities includes those entities in which a company associated with the brand is interested. For example, the company or marketer associated with the brand may want to know who is talking about the brand on social networking sites based on various topics. As discussed in more detail herein, a threshold may be applied such that only those entities above the threshold are further processed (provided with a ranking), as the entities below the threshold may not be important to the user or to the brand based on the low frequency of occurrences in the social media content or company data. At block 910, a score is calculated that represents the user's exclusiveness to the brand. The score is calculated using, at least, the differences in rankings of the entities.

Figure 10:
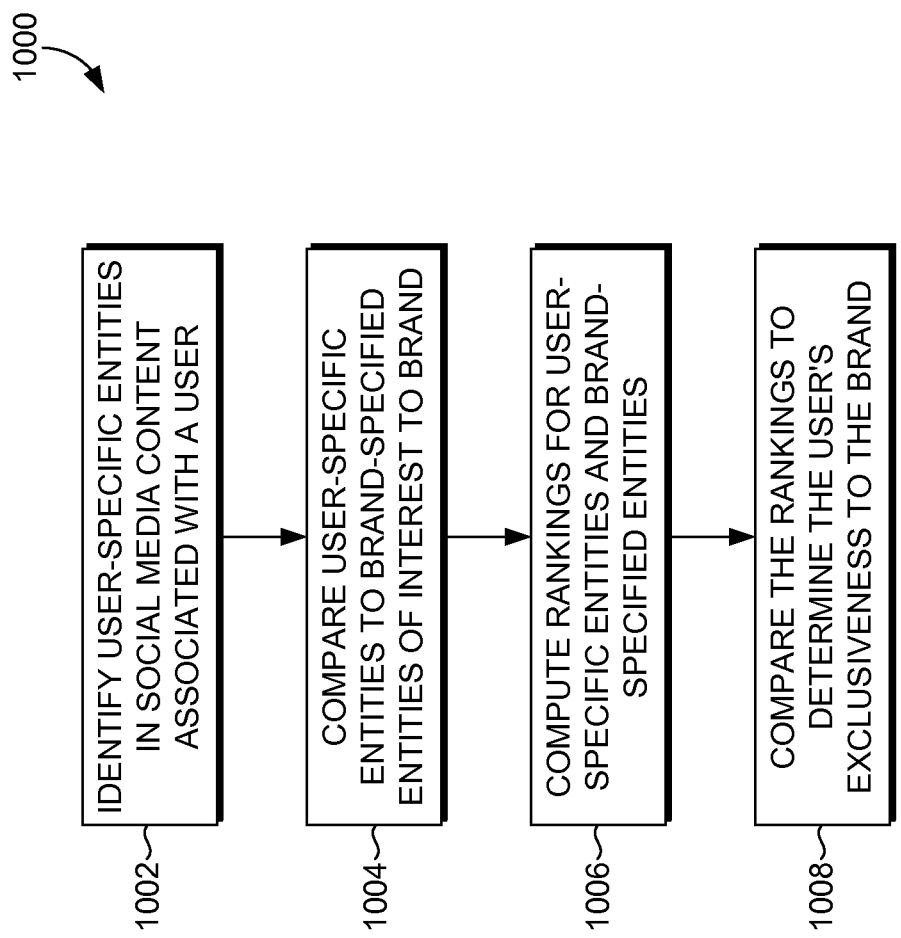

Turning now to FIG. 10, a flow diagram is provided of a method 1000 for determining a user's exclusivity with respect to a particular brand, in accordance with an embodiment of the present invention. At block 1002, user-specific entities are identified in social media content associated with a user. In embodiments, a frequency distribution may be calculated for the user-specific entities and the brand-specified entities. These frequency distributions may be compared to determine an amount of overlap between the entities. At block 1004, user-specific entities are compared to brand-specified entities of interest to a brand. Rankings are computed for the user-specific entities and for the brand-specified entities at block 1006. At block 1008, the rankings are compared to determine the user's exclusiveness to the brand.

Figure 14:
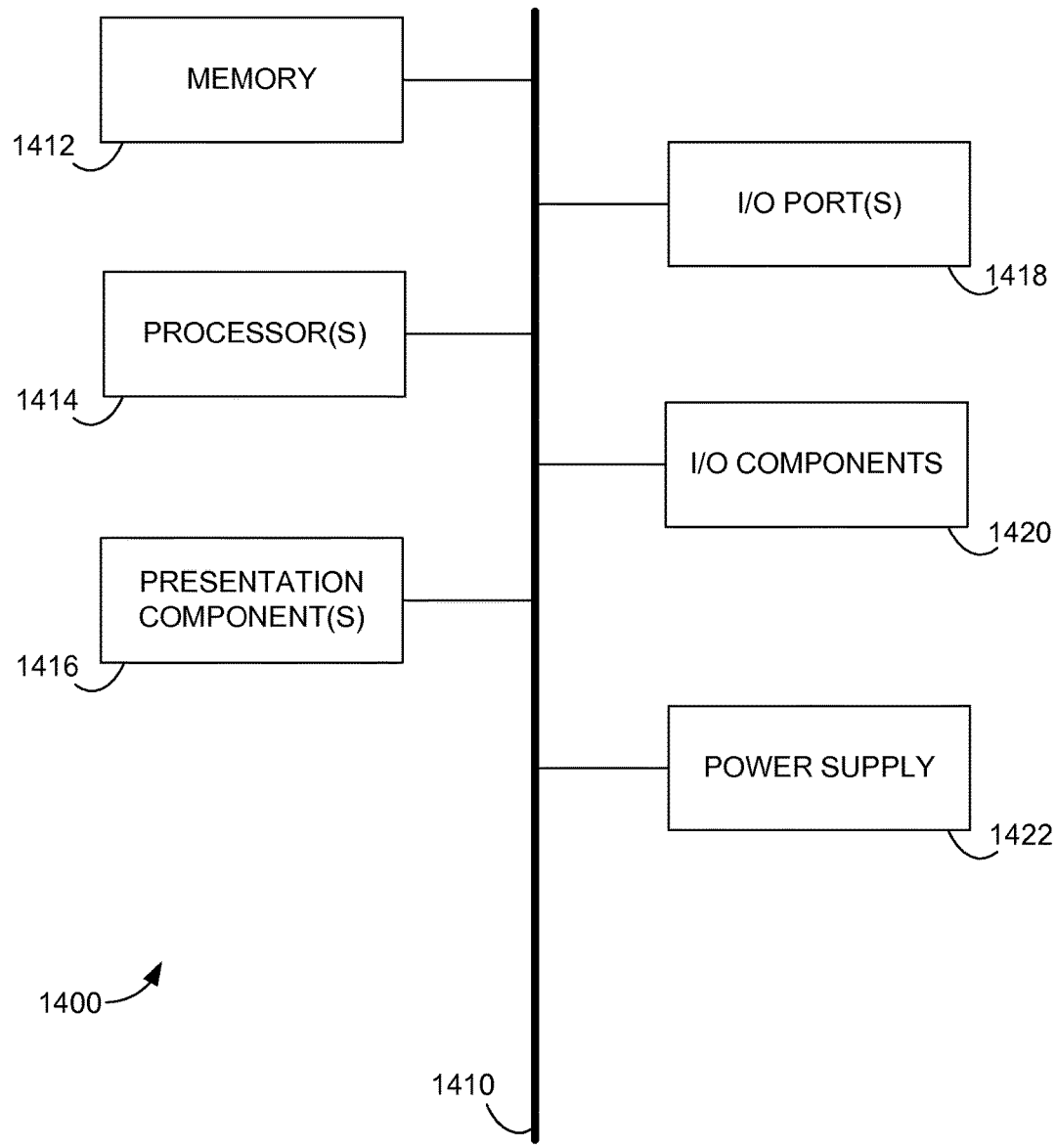
FIG. 14 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes a bus 1410 that directly or indirectly couples the following devices: memory 1412, one or more processors 1414, one or more presentation components 1416, input/output (I/O) ports 1418, input/output components 1420, and an illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer-storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instance, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1400. The computing device 1400 may be equipped with depth cameras, such as, stereoscopic camera systems, infrared camera systems, RGB camera systems, and combinations of these for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

As can be understood, embodiments of the present invention provide automatic social campaigning based on the user sentiment of user posts on competitor webpages. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   generating, by a brand entity module of a computing device, a weighted distribution of brand-related entities that are associated with a particular brand, the weighted distribution indicating an importance of each brand-related entity with respect to a totality of brand-related entities;
   receiving social media content corresponding to a plurality of users;
   extracting, for each user of the plurality of users, by a user entity module of the computing device, a plurality of user entities from social media content that is associated with a user, the plurality of user entities comprising a set of brand-related entities that is relevant to the particular brand;
   determining, by an overlap module of the computing device, a proportion of the plurality of user entities contained in the weighted distribution of the brand-related entities and a proportion of the brand-related entities contained in the plurality of user entities;
   calculating, by a weighting module of the computing device, a weight of each brand-related entity with respect to the weighted distribution of the brand-related entities and the weight of each user entity with respect to the plurality of user entities;
   based, at least, on the proportion of the plurality of user entities, the proportion of brand related entities, the weight of each brand-related entity, and the weight of each user entity, determining, by a scoring module of the computing device, a level of exclusivity of the user to the brand; and
   based on the level of exclusivity determined for each user, filtering, by the computing device, the plurality of users to generate a set of users that is exclusive to the brand.

2. The one or more computer storage media of claim 1, further comprising identifying a set of brand-specified entities that are of interest to a company associated with the brand by analyzing a plurality of data associated with the brand.

3. The one or more computer storage media of claim 2, wherein the weighted distribution of the brand-related entities is a frequency distribution of the entities in the set of brand-specified entities.

4. The one or more computer storage media of claim 3, further comprising identifying at least one entity from the set of brand-specified entities whose frequency distribution is above a predetermined threshold.

5. The one or more computer storage media of claim 3, wherein the set of brand-specified entities comprises a first set of entities that is identified in the plurality of data associated with the brand, and a second set of entities having a high co-occurrence with the entities in the first set of entities.

6. The one or more computer storage media of claim 2, further comprising:
   based on the determined weights, providing a ranking for at least a portion of the entities in the set of brand-related entities;
   based on the determined weights, providing a ranking for at least a portion of the entities in the set of brand-specified entities; and
   computing a rank distance based on a difference between the rankings for corresponding entities in the set of brand-related entities and the set of brand-specified entities.

7. The one or more computer storage media of claim 6, further comprising:
   based, at least, on the rank distance, calculating a score that represents the user's level of exclusivity to the brand.

8. The one or more computer storage media of claim 1, further comprising calculating a frequency distribution of the plurality of user entities in the social media content that is associated with the user.

9. The one or more computer storage media of claim 1, wherein the social media content is extracted from one or more social networking services with which the user has participated.

10. The one or more computer storage media of claim 1, wherein at least a portion of the plurality of entities extracted from the social media content are not relevant to the particular brand.

11. The one or more computer storage media of claim 1, further comprising: calculating an entity interest for each extracted user entity, the entity interest indicating a tendency of exclusivity of the extracted user entities in relation to the brand.

12. A computer-implemented method comprising:
   generating, by a brand entity module of a computing device, a weighted distribution of brand-related entities that are associated with a particular brand;
   extracting, by a user entity module of the computing device, from one or more social networking services with which a user has participated, a first set of entities;

calculating, via the user entity module of the computing device, a distribution of the first set of entities extracted from the one or more social networking services;

weighting, by the user entity module of the computing device, each entity in the first set of entities based on a total number of entities mentioned by the user, the weight of each entity indicating a level of interest to the user;

based on the weighting, ranking each entity in the first set of entities with respect to the calculated distribution;

determining a difference between the rankings of entities that are in the first set of entities and entities in a second set of entities, the entities in the second set are those in which the brand is interested, wherein the first set of entities and the second set of entities overlap, the determining comprising calculating a rank distance;

based, at least on the rank distance and the overlap of the first set of entities and the second set of entities, calculating, by a scoring module of the computing device, a score that represents the user's level of exclusiveness to the brand; and based on the level of exclusiveness determined for the user, determining whether the user belongs to a set of users that is exclusive to the brand.

13. The method of claim 12, further comprising calculating, via the computing device, a distribution of the second set of entities, wherein the second set of entities were extracted from company data.

14. The method of claim 13, further comprising identifying at least one entity from the first set of entities and from the second set of entities whose distribution is above a predetermined threshold based on the distribution of other entities.

15. The method of claim 12, further comprising wherein the second set of entities comprises a set of correlated entities whose entities have a high co-occurrence or correlation with the entities explicitly specified by a company associated with the brand.

16. A computerized system comprising:
one or more processors; and
one or more computer storage media storing computer-useable instructions that, when used by the one or more processors, cause the one or more processors to:
generate, by a brand-entity component of a computing device, a weighted distribution of brand-related entities that are associated with a particular brand, the brand entities indicating the interests of the brand;
identify by the computing device over a network a plurality of users having corresponding social media content that is relevant to the brand;
extract, for each user of the plurality of users, by a user entity module of the computing device a plurality of user-specific entities from the social media content that is associated with a user, wherein the user-specific entities are extracted based at least in part on the entities associated with the particular brand,
determine, by an overlap module of the computing device, a proportion of the plurality of user entities contained in the distribution of brand-related entities and a proportion of brand-related entities contained in the plurality of user entities;
calculate, by a weighting module of the computing device, the weight of each brand-related entity with respect to the weighted distribution of brand-related entities and the weight of each user entity with respect to the plurality of user entities;
compute rankings for the plurality of user-specific entities and the brand-related entities,
utilizing the rankings as inputs to a distance function, calculate a rank distance between the plurality of user-specific entities and the brand-specified entities;
based, at least, on the determined overlap, the calculated weights, and the rank distance, determining, by a scoring module of the computing device, a level of exclusivity of the user to the brand; and
based on the level of exclusivity determined for each user, filter, by the computing device, the plurality of users to generate a set of users that is exclusive to the brand.

17. The computerized system of claim 16, further comprising identifying brand-specified entities based on an analysis of company data, wherein the company data is from one or more social networking services.

18. The computerized system of claim 16, wherein the comparing of the plurality of user-specific entities with brand-specified entities further comprises:
computing a frequency distribution of the user-specific entities;
computing a frequency distribution of the brand-related entities; and
comparing the frequency distribution of the user-specific entities to the frequency distribution of the brand-related entities to determine an overlap of entities.

* * * * *